(12) United States Patent
Luo et al.

(10) Patent No.: US 12,436,333 B2
(45) Date of Patent: Oct. 7, 2025

(54) ULTRACOMPACT LIQUID-CRYSTAL-ON-SILICON DISPLAY SYSTEM

(71) Applicant: University of Central Florida Research Foundation, Inc., Orlando, FL (US)

(72) Inventors: Zhenyi Luo, Union Park, FL (US); Yuqiang Ding, Union Park, FL (US); Shin-Tson Wu, Orlando, FL (US); Yun Wang, Bellevue, WA (US); Fenglin Peng, Redmon, WA (US); Guohua Wei, Redmond, WA (US)

(*) Notice: Subject to any disclaimer, the term of this patent is extended or adjusted under 35 U.S.C. 154(b) by 0 days.

(21) Appl. No.: 19/024,782

(22) Filed: Jan. 16, 2025

(65) Prior Publication Data

US 2025/0237804 A1    Jul. 24, 2025

Related U.S. Application Data

(60) Provisional application No. 63/622,897, filed on Jan. 19, 2024.

(51) Int. Cl.
| | |
|---|---|
| *F21V 8/00* | (2006.01) |
| *G02B 27/01* | (2006.01) |
| *G02F 1/13357* | (2006.01) |

(52) U.S. Cl.
CPC ......... *G02B 6/0053* (2013.01); *G02B 6/0073* (2013.01); *G02B 6/0091* (2013.01);
(Continued)

(58) Field of Classification Search
CPC .. G02B 6/0053; G02B 6/0073; G02B 6/0091; G02B 27/0172; G02F 1/133615; G02F 1/13362
See application file for complete search history.

(56) References Cited

U.S. PATENT DOCUMENTS

| | | |
|---|---|---|
| 10,598,985 B1 | 3/2020 | Chen et al. |
| 11,531,201 B2 * | 12/2022 | Amitai ............... G02B 27/0172 |

(Continued)

OTHER PUBLICATIONS

Kunimasa, WO 2011/065052, Jun. 2011 (Year: 2011).*

(Continued)

*Primary Examiner* — Mary Ellen Bowman
(74) *Attorney, Agent, or Firm* — Fleit Intellectual Property Law; Jose Gutman

(57) ABSTRACT

Systems and methods to improve efficiency of in-coupling into, propagating through, and out-coupling from, electromagnetic waves (e.g., in a visible light wavelength range), a waveguide system arrangement. The waveguide system arrangement includes an illumination assembly; an in-coupler, a waveguide substrate, and a parallelepiped prisms array structure, which efficiently couple electromagnetic waves (e.g., in a visible light wavelength range), horizontally propagating through the waveguide substrate, and the parallelepiped prisms array structure out-couples the electromagnetic waves (e.g., in a visible light wavelength range), from the waveguide substrate. In one implementation, the waveguide system arrangement includes an augmented reality display system and the out-coupled light provides a virtual image that is overlaid on an image of a real object with both images seen by a viewer's eye. An ultracompact liquid-crystal on silicon (LCoS) display system is also disclosed. The LCoS display system exhibits excellent light uniformity, optical efficiency, and contrast ratio.

24 Claims, 7 Drawing Sheets

Prior Art

(52) U.S. Cl.
CPC ... *G02B 27/0172* (2013.01); *G02F 1/133615* (2013.01); *G02F 1/13362* (2013.01)

(56) References Cited

U.S. PATENT DOCUMENTS

| | | | |
|---|---|---|---|
| 11,860,366 B2 | 1/2024 | Eash et al. | |
| 12,117,644 B1 * | 10/2024 | Li | G02B 6/0096 |
| 2010/0177077 A1 * | 7/2010 | Larson | G02B 6/0056 |
| | | | 345/207 |
| 2018/0335631 A1 * | 11/2018 | Fan | G02B 3/0037 |
| 2021/0231860 A1 * | 7/2021 | Ma | G02B 6/0086 |
| 2021/0271006 A1 * | 9/2021 | Ronen | G02B 27/0172 |

OTHER PUBLICATIONS

Luo, Z., Cheng, Y. W., & Wu, S. T. Polarization-preserving light guide plate for a linearly polarized backlight. Journal of Display Technology, (2014). 10(3), 208-214.

* cited by examiner

ULTRACOMPACT LIQUID-CRYSTAL-ON-SILICON DISPLAY SYSTEM

CROSS-REFERENCE TO RELATED APPLICATIONS

N/A

FEDERALLY SPONSORED RESEARCH AND DEVELOPMENT

N/A

FIELD OF THE INVENTION

The present disclosure pertains to the illumination system for an ultracompact liquid-crystal-on-silicon (LCoS) display panel. More specifically, aspects and embodiments of the disclosure pertain to illumination system using a parallelepiped prism array to extract the light from waveguide or light guide plate for uniform illumination while remaining a small volume. Applications of the proposed illumination system include but are not limited to LCoS display panel, waveguide-based augmented reality display system, and general imaging systems that can benefit from the compactness and uniform illumination of the proposed system.

BACKGROUND OF THE INVENTION

Providing the advantages including high luminance, low cost, and high-resolution density, LCoS has become an attractive light engine candidate for augmented reality (AR) displays. A traditional LCoS display system includes a light source, illumination system, LCoS panel, and other polarizing components. A lens system may be utilized for projection purposes. FIG. 2 illustrates the architecture of a conventional LCoS display system. The light emitted from the light source is reflected by the polarizing beam splitter (PBS) toward the LCoS panel. Then, the light is modulated and reflected by the LCoS and passes through the PBS due to its polarization selectivity. However, utilizing the PBS leads to a relatively large volume of the illumination system, conventional LCoS display systems cannot satisfy the lightweight and compact formfactor requirements for the AR glasses.

Similarly, for a transmissive liquid crystal display (LCD) using edge-lit source, like a notebook computer, also requires uniform illumination with a compact formfactor. To achieve these goals, in 2014, Luo and Wu proposed an edge-lit light guide plate based on total internal reflection (TIR) (Z. Luo and S. T. Wu, Polarization-preserving light guide plate for a linearly polarized backlight, J. Disp. Technol. 10, 208-214 (2014)). The light from the edge-lit source 110, e.g., a light-emitting diode (LED) array, is extracted to illuminate the LCD panel using a specially designed output film 120 (also referred to herein as a parallelepiped prism array) on the exit (top) side 142 of the light guide plate 140 and a reflector 130 on the opposite (bottom) side 144 of the light guide plate 140 (recycling optics) to recycle the leaked light from the light guide plate 140. That means, such a device 100 configuration is reflective, i.e., the LED light from the light source 110 is reflected vertically upward from the light guide plate 140, through the top side 142 thereof, and through the parallelepiped prism array 120. The LED light is emitted vertically upward 150 from the parallelepiped prism array 120 as shown in FIG. 1.

Any light incident on the top side 142 of the light guide plate 140 (the side that is directly coupled to the parallelepiped prism array 120), cannot transmit vertically downward through the light guide plate 140 because the embedded reflector 130 at the bottom side 144 of the light guide plate 140 reflects the light vertically upward into the light guide plate 140.

SUMMARY OF THE DISCLOSURE

Various example implementations of the present disclosure provide an ultracompact illumination system for liquid-crystal-on-silicon (LCoS) displays, which shows excellent light uniformity, optical efficiency, and contrast ratio.

Various implementations provide an ultracompact illumination system including a light source, an in-coupler, a light guide plate, parallelepiped prisms, LCoS panel, and other polarizing components. According to an example implementation, the output beam from the light source is coupled into the light guide plate using an in-coupler. The light beam is then trapped and horizontally propagates inside the light guide plate due to total internal reflection (TIR). Multiple TIRs occur at the top and bottom surfaces of the light guide plate to enable uniform illumination near the bottom surface. An extraction layer consisting of multiple parallelepiped prisms, according to an example, is directly optically coupled (e.g., attached) to the bottom of the light guide plate. At least some of the trapped light from the light guide plate enters the parallelepiped prisms and is thereby extracted vertically downward toward the LCoS panel. The combination of light guide plate and parallelepiped prisms replaces the polarizing beam splitter (PBS) to achieve uniform illumination at the LCoS panel surface while keeping an ultracompact formfactor. The size of each parallelepiped prism is larger than the wavelength of visible light to reduce diffraction effect. The spatial distribution of the parallelepiped prisms is optimized to provide a uniform illumination for the LCoS panel so that it may not be periodic. The light incident onto the LCoS surface is modulated by the applied voltage and then reflected to the extraction prisms and the light guide plate. Afterwards, the light passes through the illumination system and can be used for many applications. The proposed system offers excellent color performance as it only consists of refractive optics. In certain embodiments, the present LCoS display system may be integrated into a near-eye display device as the light engine to project image content to the user's eyes. According to various embodiments, the present illumination system may be used for waveguide-based augmented reality display system. The extraction prisms can extract the trapped light and direct the light to the viewer's eye pupil. In certain embodiments, a projection lens system may be inserted between the extraction prisms and the LCoS panel.

Features and advantages of the above-described various embodiments will become readily apparent from the following description and accompanying drawings. Certain preferred embodiments of the invention and their benefits will also become more apparent to a person of ordinary skill in the art through the description and selected examples given herein below, and through the appended claims.

All references, publications, patents, and patent applications, cited herein and/or cited in any accompanying Information Disclosure Statement (IDS), are hereby incorporated herein by reference in their entirety for all purposes.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to illustrate various examples and to explain various principles and advantages all in accordance with the present disclosure, in which.

DETAILED DESCRIPTION

Figure 1:
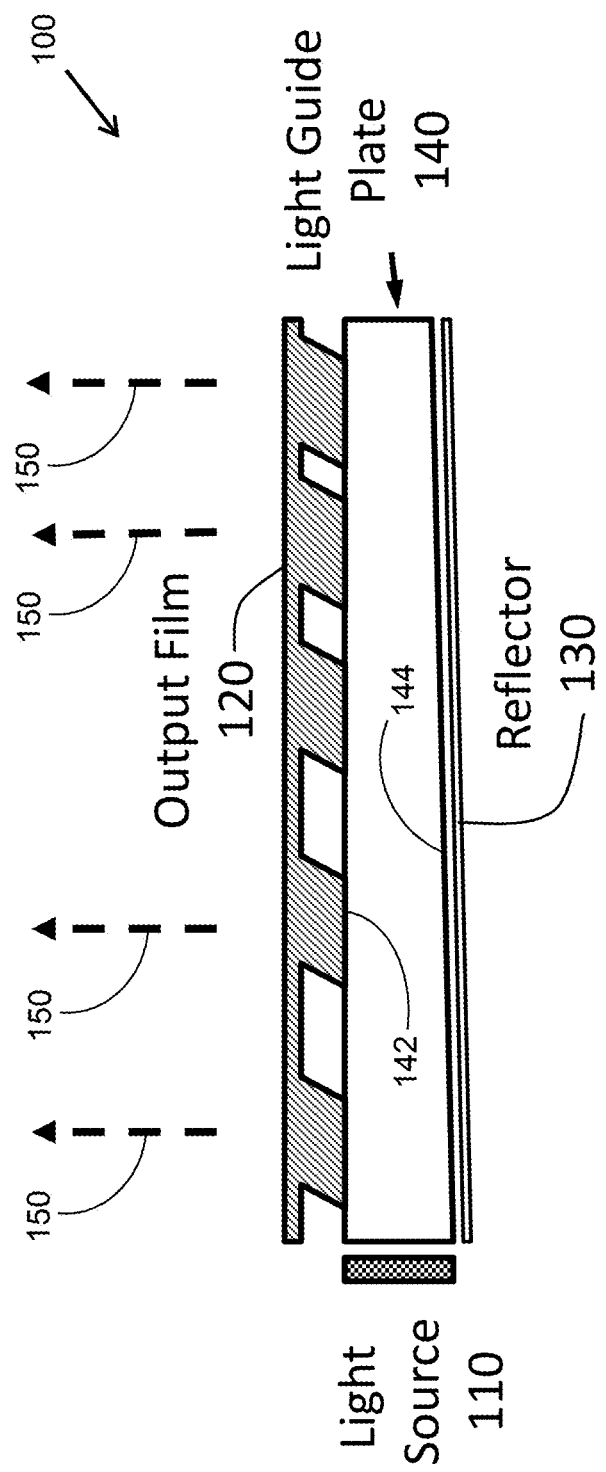
FIG. 1 illustrates an example structure of an edge-lit system for liquid crystal displays.

As required, detailed embodiments are disclosed herein; however, it is to be understood that the disclosed embodiments are merely examples and that the devices, systems, and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

Non-Limiting Definitions

The term "angular distribution" is intended to mean herein how the intensity of light varies with respect to the emission angle. The angular distribution of output light intensity from a light source may need to be modulated (e.g., modified) to ensure a higher coupling efficiency for a subsequent process (e.g., for coupling the modulated light into a waveguide of augmented reality devices).

The terms "light guide plate", "transparent substrate", "waveguide", or "transparent waveguide substrate", and "transparent planar waveguide substrate", and the like, are intended to mean herein a substrate structure that is permeable to electromagnetic radiation (EMR) of a specified wavelength range, e.g., in a visible light wavelength range. The substrate structure may also comprise a waveguide substrate that horizontally propagates EMR, e.g., light, along the inside of the waveguide substrate.

A transparent substrate does not necessarily have to be transparent to all electromagnetic radiation wavelength ranges. For example, and not for limitation, it can be transparent to certain specified wavelength range(s), e.g., blue visible light to red visible light, while being opaque to another wavelength range outside of the certain specified wavelength range(s). For example, it might be opaque to certain light wavelength range(s) with shorter wavelengths than the certain specified wavelength range(s) of blue visible light to red visible light.

As used herein, the terms "vertical" or "vertically" are intended to refer to a direction generally perpendicular to a surface of a substrate structure, such as perpendicular to a planar surface of a waveguide structure. As used herein, the terms "horizontal" or "horizontally" are intended to refer to a direction generally parallel to a surface of a substrate structure, such as horizontal to a planar surface of a waveguide structure.

As used herein, the terms "waveplate", "quarter-wave plate", "quarter-wave retarder", or the like, are intended to mean an optical device that alters the polarization state of a linear polarized or a circular polarized light wave travelling through it. The behavior of a waveplate depends on various parameters, such as the thickness of the wave-plate, the wavelength of the polarized light, and the variation of the index of refraction. By appropriate choice of the relationship between these parameters, it is possible to introduce a controlled phase shift between two polarization components of a light wave, thereby altering its polarization.

Introduction

Near-eye display systems, and more specifically waveguide-based displays, including a small form factor, are becoming very much in demand. Waveguide-based displays enable near-eye displays, such as used by virtual-reality (VR) systems and augmented-reality (AR) systems, which generally must be lightweight and have a slim form factor, while keeping high optical performance. Various embodiments of the present invention dramatically improve the efficiency of light in-coupling, propagation, and out-coupling, in waveguide-based displays which can be used in near-eye display systems.

As one example limitation of conventional lighting systems, the device 100 shown in FIG. 1, as has been discussed above, reflects vertically upward 150 any light incident on the top side 142 of the light guide plate 140 (the side that is directly coupled to the parallelepiped prism array 120), and no light can transmit vertically downward from the light guide plate 140 because the embedded reflector 130 at the bottom side 144 of the light guide plate 140 reflects the light vertically upward back into the light guide plate 140. As will be appreciated from the discussion herein, such a device 100 cannot be used for implementing a LCoS illumination system according to various examples disclosed herein.

According to various embodiments, as will be discussed in more detail by examples provided below, an implementation of a LCoS illumination system will in-couple edge-lit LED light into a light guide plate and the in-coupled light will be extracted from the light guide plate by a parallelepiped prism array, modulated and reflected by a LCoS panel, and then it will pass vertically through the parallelepiped prism array and the light guide plate and vertically emitted therefrom. Subsequently, the emitted light, which was reflected from the LCoS panel and passed through the parallelepiped prism array and the light guide plate, will create an image that can be used as a new light source, as one example, for augmented reality displays.

Figure 2:
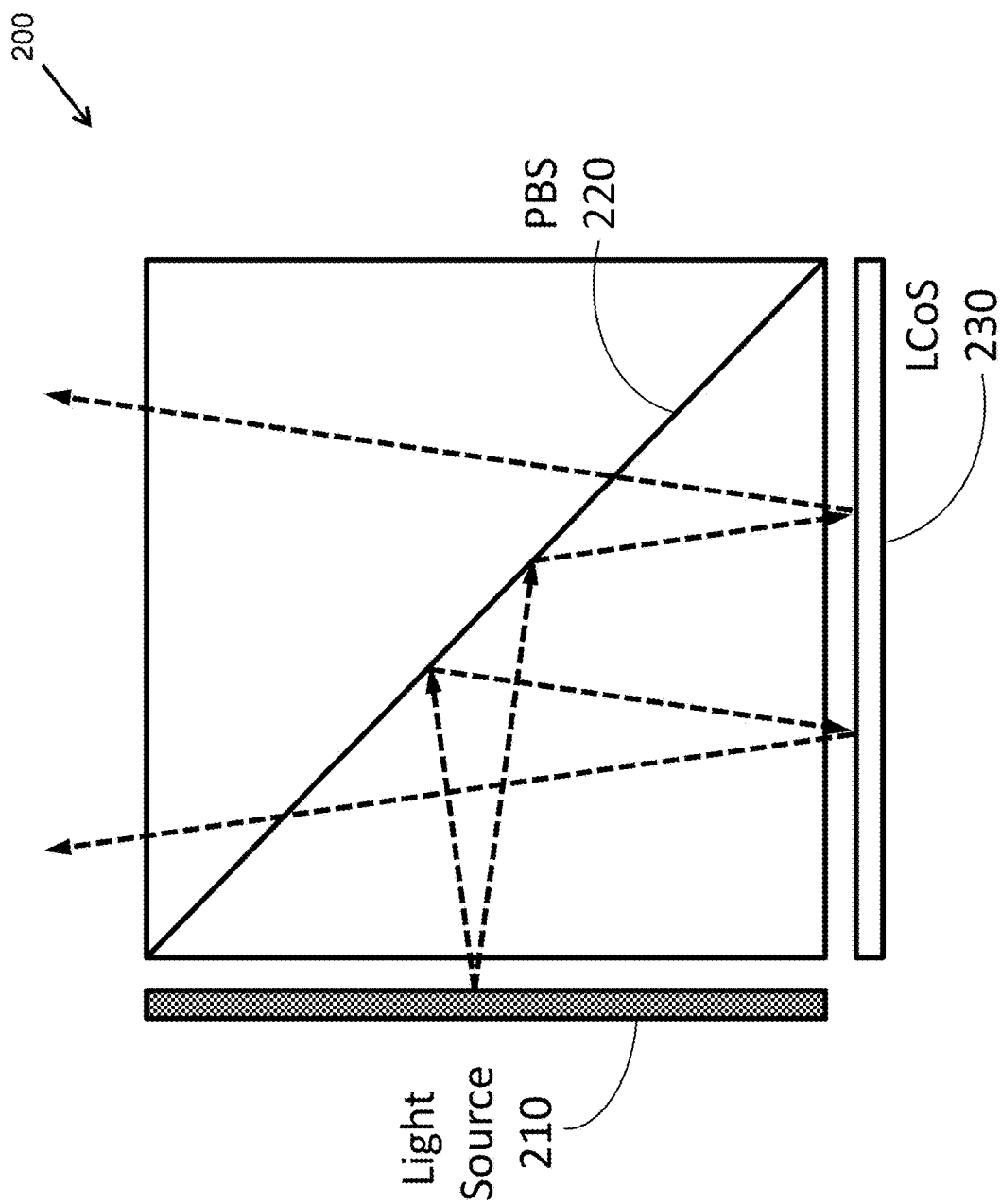
FIG. 2 is a schematic cross-sectional diagram of a conventional liquid-crystal-on-silicon (LCoS) display system using a polarizing beam splitter (PBS) as the illumination optics.

FIG. 2 schematically illustrates the architecture of a conventional LCoS display system. The light emitted from light source 210 may comprise polarized or unpolarized light. A linear polarizer may be used to control the polarization state of the light. The output light then strikes the polarizing beam splitter (PBS) 220 in a beam splitter cube, as shown, and is reflected to the LCoS panel 230 surface. A polarizing optical component may be used to change the polarization state of the light incident to the LCoS panel 230 surface, which is able to modulate the phase retardation of the incident light and then reflect it back to the PBS 220. The reflected light now can pass through the PBS 220 due to the polarization selectivity of the PBS 220. An imaging lens, according to various embodiments, may be used for further projection purposes.

Figure 3:
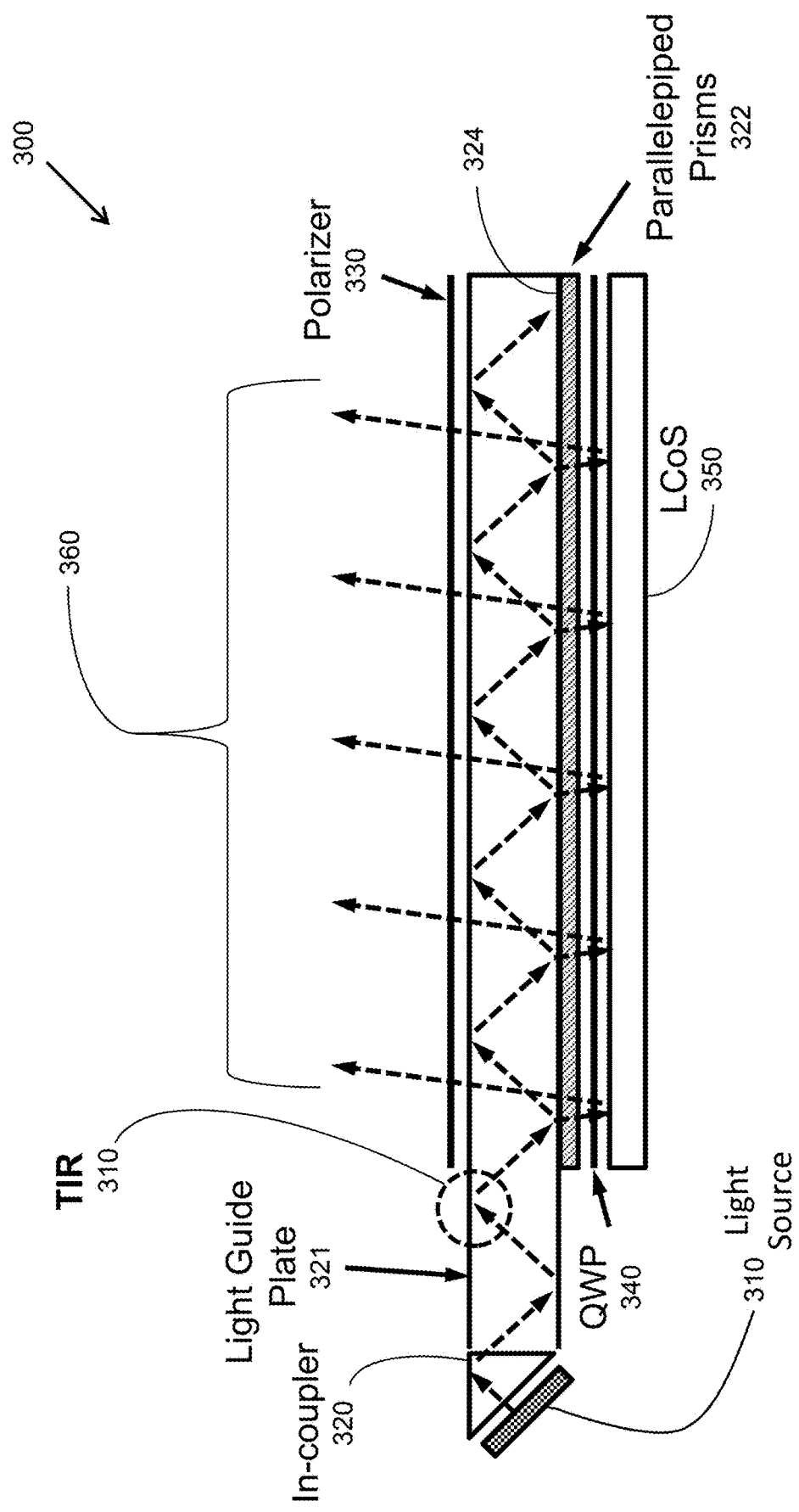
FIG. 3 is a schematic cross-sectional diagram of an example embodiment with a compact illumination system.

FIG. 3 illustrates the cross-sectional diagram of one example implementation with a compact illumination system 300. The light source 310 may be polarized or unpolarized. A polarizing component (such as a linear polarizer or reflective polarizer) may be used to control the polarization state of the light emitted from the light source 310 before the light enters the light guide plate 321. Any other element that helps recycle the wasted light may be adopted in the system to enhance the system efficiency. Any other element that can control the emission cone of the light source 310 may be used depending on the design of the system 300. For example, the light source 310 may include an optical system to modulate (e.g., modify) angular distribution of output light intensity.

An in-coupler 320, according to the example, is used for coupling the light from the light source 310 into the light guide plate 321. In this example, the in-coupler 320 includes, but is not limited to, a right-angle prism as shown in FIG. 3. Other elements such as a partial mirror that can couple the light into the light guide plate 321 may be used as at least a part of the in-coupler 320.

The example light guide plate 321 shown in FIG. 3 is a rectangular cuboid. It should be understood that other geometries for the light guide plate 321 are possible within the scope of various example implementations according to the present disclosure. The rectangular cuboid may be optimized with a small tilt angle with respect to the light propagation direction (wedge shape) for uniform illumination. The light coupled into the light guide plate 321 is trapped and propagated due to total internal reflection (TIR) 310.

A parallelepiped prisms array structure 322, according to the example, is directly optically coupled (e.g., attached) to a surface of a bottom side 324 of the light guide plate 321. At least some of the trapped light rays propagating in light guide plate 321 can enter, propagating through the bottom side 324 of the light guide plate 321, into the parallelepiped prisms array structure 322, as shown in FIG. 3. Another TIR occurs at the surface of prism 322 and at least a portion of the incident light rays will be reflected through the parallelepiped prisms array structure 322 and transmitted in a vertically downward direction toward the LCoS panel 350. Optionally, polarizing components such as a quarter-wave plate (QWP) 340 may be added to modulate the polarization state of the incident light. Other optical elements that can control the polarization state of light may be used.

The phase retardation of the light extracted out from the light guide plate 321 is modified (e.g., modulated) by the LCoS 350. Then according to the example, after phase modulation, the light is reflected by the LCoS 350 in a vertically upward direction toward the light guide plate 321 and then the light 360 passes through the QWP 340, the parallelepiped prisms 322, and the light guide plate 321. A polarizer 330 can be used to absorb or reflect components of the light 360 with undesired polarization states. The polarizer 330, in this example, includes but is not limited to absorptive polarizer and reflective polarizer.

Figure 4:
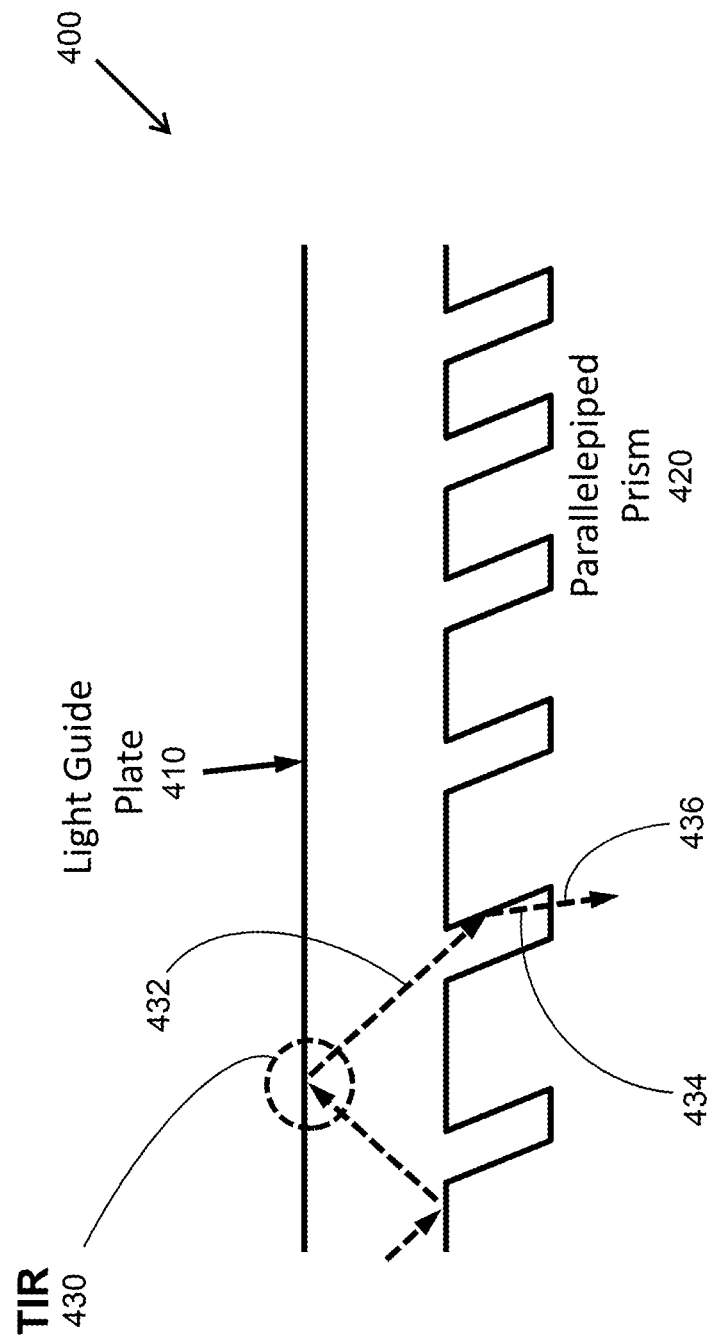
FIG. 4 illustrates a detailed view of extraction optics such as shown in FIG. 3, consisting of multiple parallelepiped prisms.

FIG. 4 illustrates an example implementation of a compact illumination system 400 showing an enlarged view of an example parallelepiped prisms array structure 420 directly optically coupled with a bottom surface of a light guide plate 410. The light trapped and horizontally propagating by TIR 430 in the light guide plate 410 includes light ray 432 that enters the extraction prism 420 and is reflected as indicated by light ray 434 and propagated through the prism 420 in a vertically downward direction as indicated by the light ray 436 as shown. According to various embodiments, the spatial distribution of the parallelepiped prisms 420 can be periodic, non-periodic, or any other optimized distribution to achieve uniform illumination in a vertically downward direction toward a LCoS panel (not shown in FIG. 4) as indicated by the light ray 436.

Figure 5:
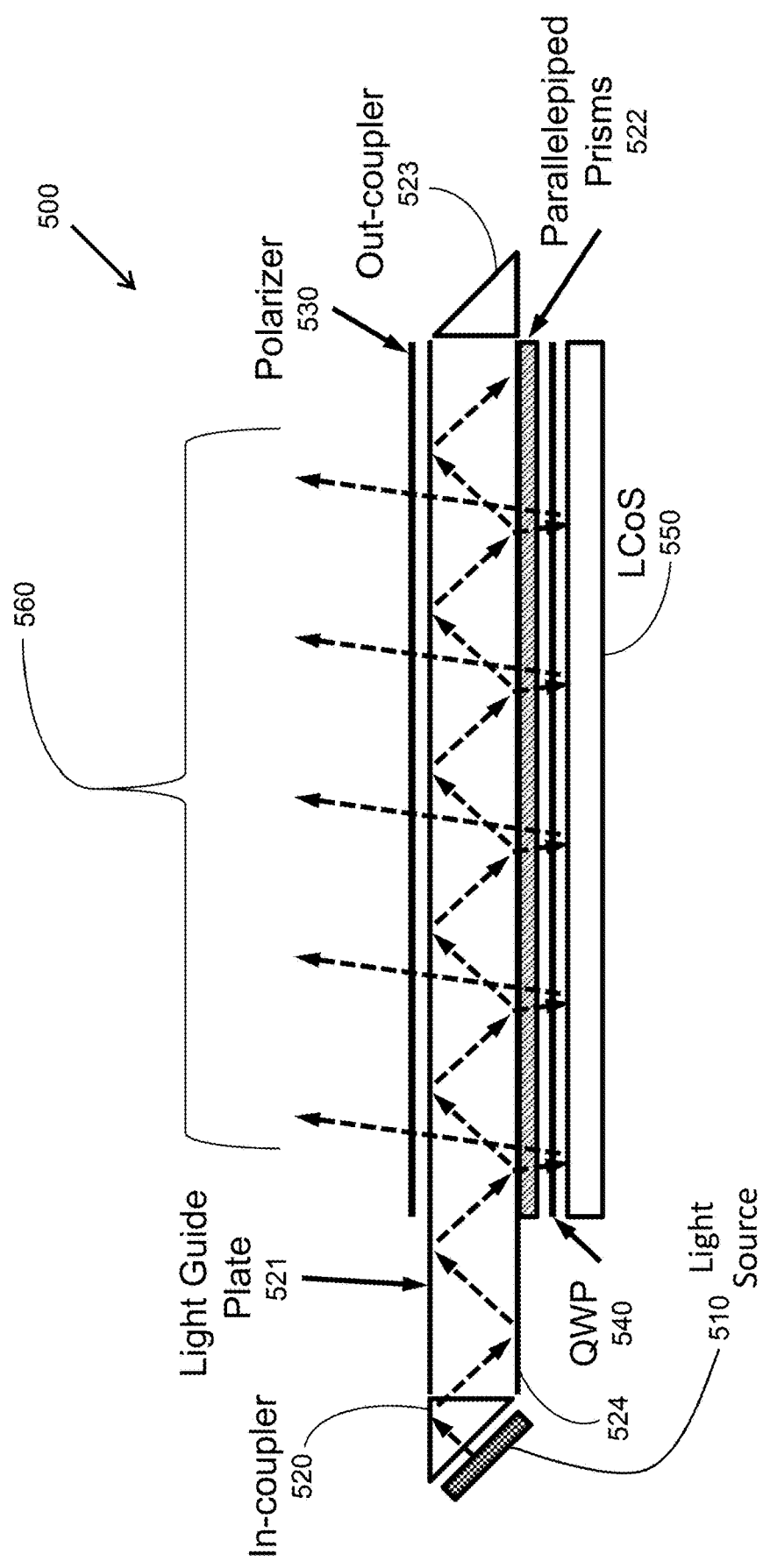
FIG. 5 illustrates an example of a compact LCoS system with an out-coupler at the distal end side of the light guide plate.

FIG. 5 illustrates one example implementation of a compact illumination system 500 with an out-coupler 523 located at a distal end (far side) of the light guide plate 521. A light source 510, according to the example, couples output light to an in-coupler 520, which couples the light into the light guide plate 521. It should be noted that the light source 510, according to various embodiments, can include an optical system to modulate the output light. For example, and not for limitation, the light source 510 may include an optical system to modulate (e.g., modify) angular distribution of output light intensity. Other types of modulation of the output light from the light source 510 are anticipated according to various embodiments. Additionally, to deliver full-color images to a user of, for example, an ultracompact LCoS display system, the light source 510 is typically expected to emit light of different colors (usually red, green and blue). However, the light source 510 can also emit a single color of light, for example to achieve a brighter image, due to the different efficacy of light sources with different colors. After light from the light source 510 is in-coupled by the in-coupler 520, the trapped and horizontally propagating light inside the light guide plate 521, that reaches the distal end of the light guide plate 521, can be coupled out by the out-coupler 523 instead of reflecting back toward the direction of the light source 510 by an end surface of the light guide plate 521, which may degrade the contrast ratio of the LCoS system 500. The out-coupler 523 shown in the example of FIG. 5 is a right-angle prism. Other components that can extract or absorb the light horizontally propagating through the light guide plate 521 toward the distal end thereof may be used as an out-coupler structure as well. The structures and functions of examples of the parallelepiped prisms structure 522 (directly optically coupled to the bottom surface 524 of the light guide plate 521), the QWP 540, the LCoS panel 550, and the polarizer 530, have already been discussed above. Here, the QWP 540 is optional. If it is absent, then the incident light to the LCoS panel 550 will be linearly polarized. If QWP 540 is present, then the incident light to the LCoS panel 550 will be circularly polarized. The circularly polarized light helps to reduce the fringing field effects of a vertically aligned LCoS, as discussed by K. H. Fan-Chiang, S. T. Wu, and S. H. Chen, "High-definition vertically-aligned liquid crystal microdisplay using a circularly polarized light," Appl. Phys. Lett. 87, 031110 (2005).

Figure 6:
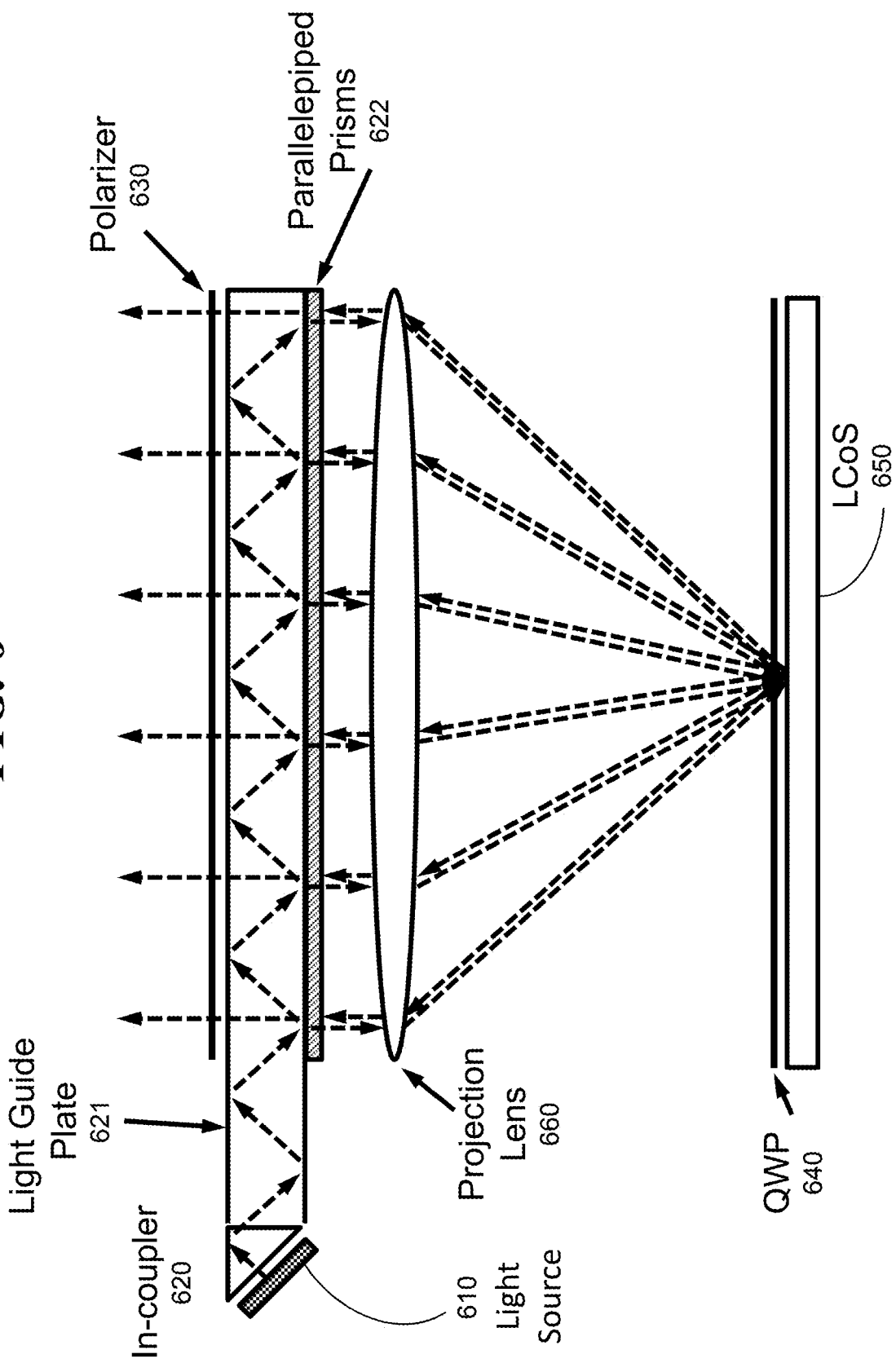
FIG. 6 illustrates another example of a compact LCoS system with a projection lens disposed between the extraction prisms and the LCoS panel surface.

FIG. 6 illustrates an example of various embodiments of the invention with a light projection system disposed between the parallelepiped prisms array structure 622 and the LCoS panel 650. A light source 610 couples output light to an in-coupler 620, which couples the light into the light guide plate 621. It should be noted that the light source 610, according to various embodiments, can include an optical system to modulate the output light. For example, and not for limitation, the light source 610 may include an optical system to modulate (e.g., modify) angular distribution of output light intensity. Other types of modulation of the output light from the light source 610 are anticipated according to various embodiments. Additionally, to deliver full-color images to a user of, for example, an ultracompact LCoS display system, the light source 610 is typically expected to emit light of different colors (usually red, green and blue). However, the light source 610 can also emit a single color of light, for example to achieve a brighter image, due to the different efficacy of light sources with different colors. Light extracted from the light guide plate 621 by the parallelepiped prisms array structure 622, gains designed optical power and is focused on the LCoS panel 650. According to the example, a refractive lens is illustrated in FIG. 6 as the projection lens 660. Any other optical components that can provide similar functions may be also used in the light projection system. Light after phase modulation is reflected by the LCoS panel 650 surface and passes through the projection lens 660. The collimated light then, according to the example, traverses in a vertically upward direction through the parallelepiped prisms array structure 622, the light guide plate 621, and the polarization filter 630, as shown. The structure and function of the example QWP 640 has already been discussed above.

Figure 7:
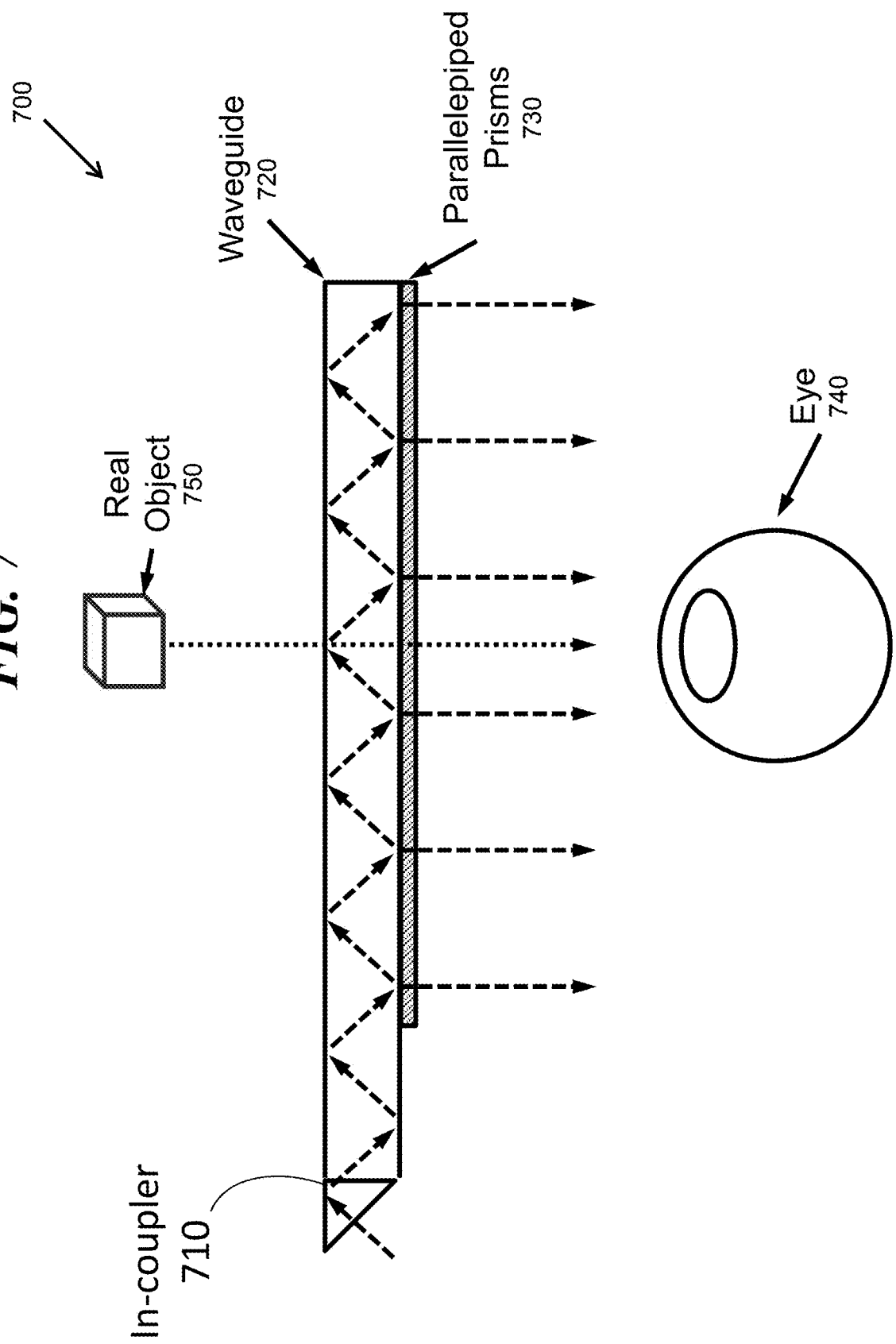
FIG. 7 illustrates a schematic cross-sectional diagram of an example waveguide-based AR display system using parallelepiped prisms as an out-coupler, according to various embodiments. The viewer can contemporaneously see a virtual image, coming from the in-coupler, which is overlaid on an image of the surrounding real objects behind the waveguide.

FIG. 7 illustrates various embodiments comprising examples of a parallelepiped prisms array structure 730 and a combiner waveguide 720 in a waveguide-based AR display system 700. The input light from a light engine and projection system (not shown in FIG. 7) is in-coupled into the combiner waveguide 720 using an in-coupler 710. The in-coupler 710, according to the example, includes but is not limited to right angle prisms. Any other types of optical elements that are used to in-couple the light into the combiner waveguide 720 can work as the in-coupler. In-coupled light inside the combiner waveguide 720 is trapped in and horizontally propagates through the combiner waveguide 720 due to TIR at surfaces in the combiner waveguide 720, until at least a portion of the propagating light enters the parallelepiped prisms array structure 730 and is thereby extracted out from the combiner waveguide 720 and directed to a viewer's eye 740. The size of the parallelepiped prism array can be designed to fit the desired exit pupil. The viewer can see the virtual image from the light coming from the in-coupler and contemporaneously also see the image of the real object 750 behind the combiner waveguide 720. That is, light from the real object 750 (e.g., reflected light from the real object 750) can transmit through the combiner waveguide 720 and the parallelepiped prisms array structure 730, and thereby an image of the real object 750 can reach the viewer's eye 740, while contemporaneously the virtual image from the light coming from the in-coupler is overlaid on the image of the real object 750 and the two overlaid images are seen at the same time by the viewer's eye 740.

Non-Limiting Examples

The present invention may be implemented as a system and/or a method, at any possible technical detail level of integration.

Although the present specification may describe components and functions implemented in various examples with reference to particular standards and protocols, the invention is not limited to such standards and protocols. Each of the standards represents examples of the state of the art. Such standards are from time to time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description and the following claims. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense. For the sake of clarity and succinctness, the components and details which are not essential in order to explain the scope of the invention have been omitted in the drawings.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, optical, wired, wireless, or other communications media. The terms "communicatively coupled" or "communicatively coupling" include, but are not limited to, communicating light signals and/or electronic control signals, by which one element may direct or control another. The term "configured to" describes one or more structures, or a combination of structures, that is set up, arranged, built, composed, constructed, designed or that has any combination of these characteristics to carry out a given function. The term "adapted to" describes one or more structures or a combination of structures that is capable of, able to accommodate, to make, or that is suitable to carry out a given function.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The phrases "at least one of <A>, <B>, . . . and <N>" or "at least one of <A>, <B>, . . . N, or combinations thereof" or "A, B, . . . and or N" are defined by the Applicant in the broadest sense, superseding any other implied definitions hereinbefore or hereinafter unless expressly asserted herein by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The corresponding structures, materials, acts, and equivalents of all means or step plus function elements in the claims below are intended to include any structure, material, or act for performing the function in combination with other claimed elements as specifically claimed.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The description of the various embodiments of the present invention has been presented by various examples for purposes of illustration and description, but is not intended to be exhaustive or limited to the invention in the form disclosed. Many modifications and variations will be apparent to those of ordinary skill in the art without departing from the scope of the invention. The examples were chosen and described in order to best explain the principles of the invention and the practical application, and to enable others of ordinary skill in the art to understand the invention for various embodiments with various modifications as are suited to the particular use contemplated.

What is claimed is:

1. A waveguide assembly, comprising:
a transparent waveguide substrate;
an in-coupler directly optically coupled to one end of the transparent waveguide substrate;
a parallelepiped prisms array structure directly optically coupled to a first horizontal side of the transparent waveguide substrate, the parallelepiped prisms array structure for extracting from the transparent waveguide substrate light that has been in-coupled by the in-coupler; and
wherein the light that has been extracted is directed by the parallelepiped prisms array structure toward a viewer's eye as a first image.

2. The waveguide assembly of claim 1, wherein the transparent waveguide substrate and the parallelepiped prisms array structure are transparent to light vertically received by a second horizontal side of the transparent waveguide substrate, the second horizontal side being opposite to the first horizontal side, the light vertically received is transmitted through the transparent waveguide substrate and the parallelepiped prisms array structure toward the viewer's eye as a second image from an object located behind the transparent waveguide substrate and seen by the viewer's eye, the transparent waveguide substrate combines and overlays the first image on the second image.

3. A method for a waveguide assembly including a transparent waveguide substrate, an in-coupler directly optically coupled to one end of the transparent waveguide substrate, and a parallelepiped prisms array structure directly optically coupled to a first horizontal side of the transparent waveguide substrate, the method comprising:
in-coupling, by the in-coupler, light from a light source into the transparent waveguide substrate;
horizontally propagating in-coupled light through the transparent waveguide substrate toward a distal end thereof;
extracting, by the parallelepiped prisms array structure, at least a portion of the horizontally propagating light from the transparent waveguide substrate light; and
directing, by the parallelepiped prisms array structure, the extracted light toward a viewer's eye as a first image.

4. The method of claim 3, further comprising:
vertically receiving by a second horizontal side of the transparent waveguide substrate, the second horizontal side being opposite to the first horizontal side, light emitted from a real object behind the transparent waveguide substrate; and
transmitting the vertically received light through the transparent waveguide substrate and the parallelepiped prisms array structure and toward the viewer's eye as a second image, and contemporaneously combining and overlaying therewith the first image.

5. An ultracompact LCoS display system comprising:
one or more light sources to emit light;
an illumination system includes parallelepiped prisms with spatially varying distribution to direct the light from the light sources to a LCoS panel, wherein the illumination system includes an in-coupler to direct the light from the light sources into a light guide plate that further directs the light to the LCOS panel;
the LCOS panel to modulate the light and reflect the light; and
polarizing components to control the polarization state of the light.

6. The ultracompact LCOS display system according to claim 5, wherein the light sources include one or more LEDs.

7. The ultracompact LCOS display system according to claim 5, wherein the light sources emit light beams of the same color.

8. The ultracompact LCOS display system according to claim 5, wherein the light sources emit light beams of different colors.

9. The ultracompact LCOS display system according to claim 5, wherein the light sources include a polarization filter.

10. The ultracompact LCOS display system according to claim 5, wherein the light sources include an optical system to modulate angular distribution of output light.

11. The ultracompact LCOS display system according to claim 5, wherein the light sources include a recycling optics to improve system efficiency.

12. The ultracompact LCOS display system according to claim 5, wherein the illumination system includes a parallelepiped prisms array structure optically coupled to a horizontal side of the light guide plate to extract at least some of the light propagating in the light guide plate and direct the extracted light to the LCOS panel.

13. The ultracompact LCOS display system according to claim 12, wherein the illumination system includes an out-coupler at a distal end of the light guide plate to extract or absorb the light that is not extracted out by the parallelepiped prisms array structure optically coupled to a horizontal side of the light guide plate.

14. The ultracompact LCOS display system according to claim 5, wherein the illumination system includes a parallelepiped prisms array structure to extract light propagating in the light guide plate and direct the light to the LCOS panel.

15. The ultracompact LCOS display system according to 14, wherein a spatial distribution of parallelepiped prisms can be periodic or non-periodic.

16. The ultracompact LCOS display system according to claim 5, wherein the LCOS display system includes a projection system.

17. The ultracompact LCOS display system according to claim 16, wherein the LCOS display system includes a parallelepiped prisms array structure optically coupled to a horizontal side of the light guide plate to extract at least some of the light propagating in the light guide plate and direct the extracted light to the LCOS panel, and the projection system is located between the parallelepiped prisms array structure and a surface of the LCOS panel.

18. The ultracompact LCOS display system according to claim 16, wherein the projection system is located between the light guide plate and the LCOS panel.

19. The ultracompact LCOS display system according to claim 5, wherein the polarizing components include a polarization filter above a horizontal surface of the light guide plate to absorb the light with undesired polarization states.

20. A near-eye display system including the ultracompact LCOS display system of claim 5, wherein the ultracompact LCOS display system is optically coupled with a combiner waveguide that receives the modulated light from the ultracompact LCOS display system and thereby displays a virtual image to users of the near-eye display system.

21. The near-eye display system of claim 20, wherein the combiner waveguide displays the virtual image from the ultracompact LCOS display system as a virtual image overlaid on an image of a real object located behind the combiner waveguide, wherein light from the real object transmits through the combiner waveguide and to a viewer's eye while at the same time the virtual image is overlaid on the image of the real object.

22. An AR display system comprising:
one or more light sources to emit light;
a waveguide with an in-coupler to receive the light from the one or more light sources; and
an out-coupler consisting of multiple parallelepiped prisms for light extraction and pupil expansion.

23. The AR display system according to 22, wherein the light sources include a projection system.

24. The AR display system according to 22, wherein a spatial distribution of the parallelepiped prisms is periodic or non-periodic for uniform illumination.

* * * * *